(12) United States Patent
Wheeler et al.

(10) Patent No.: US 9,131,520 B1
(45) Date of Patent: Sep. 8, 2015

(54) PACKET EXCHANGE ARBITRATION FOR COEXISTING RADIOS

(71) Applicant: Marvell International Ltd., Hamilton (BM)

(72) Inventors: Todd Steven Wheeler, San Jose, CA (US); Gladys Yuen Yan Wong, Fremont, CA (US); Robert Mack, San Jose, CA (US); Ken Kinwah Ho, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/456,460

(22) Filed: Aug. 11, 2014

Related U.S. Application Data

(63) Continuation of application No. 13/923,949, filed on Jun. 21, 2013, now Pat. No. 8,804,690, which is a continuation-in-part of application No. 12/732,036, filed on Mar. 25, 2010, now Pat. No. 8,472,427.

(60) Provisional application No. 61/166,985, filed on Apr. 6, 2009.

(51) Int. Cl.
*H04W 72/10* (2009.01)
*H04W 72/12* (2009.01)
*H04W 72/04* (2009.01)

(52) U.S. Cl.
CPC ...... *H04W 72/1215* (2013.01); *H04W 72/1242* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 4,337,463 | A | 6/1982 | Vangen |
| 4,805,215 | A | 2/1989 | Miller |
| 5,347,234 | A | 9/1994 | Gersbach et al. |
| 5,634,207 | A | 5/1997 | Yamaji et al. |
| 5,673,291 | A | 9/1997 | Dent |
| 5,708,656 | A | 1/1998 | Noneman et al. |
| 5,847,616 | A | 12/1998 | Ng et al. |
| 5,995,819 | A | 11/1999 | Yamaji et al. |
| 6,167,245 | A | 12/2000 | Welland et al. |
| 6,285,262 | B1 | 9/2001 | Kuriyama |
| 6,320,919 | B1 | 11/2001 | Khayrallah et al. |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

(Continued)

*Primary Examiner* — Alex Skripnikov

(57) ABSTRACT

The present specification describes techniques for packet exchange arbitration. In some embodiments, a request is maintained to an arbiter at least until a packet exchange has been communicated and/or at least until a time-sensitive packet is communicated. In some other embodiments, a grant of a request is delayed at least until the communication of an isochronous packet.

20 Claims, 5 Drawing Sheets

(56) References Cited

U.S. PATENT DOCUMENTS

| | | |
|---|---|---|
| 6,347,091 B1 | 2/2002 | Wallentin et al. |
| 6,366,622 B1 | 4/2002 | Brown et al. |
| 6,374,117 B1 | 4/2002 | Denkert et al. |
| 6,438,364 B1 | 8/2002 | Waite |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,816,452 B1 | 11/2004 | Maehata |
| 6,816,718 B2 | 11/2004 | Yan et al. |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,092,428 B2 | 8/2006 | Chen et al. |
| 7,139,540 B2 | 11/2006 | Wu et al. |
| 7,173,431 B1 | 2/2007 | Lo et al. |
| 7,206,840 B2 | 4/2007 | Choi et al. |
| 7,212,798 B1 | 5/2007 | Adams et al. |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,463,592 B2 | 12/2008 | Poncini et al. |
| 7,529,548 B2 | 5/2009 | Sebastian |
| 7,551,948 B2 | 6/2009 | Meier et al. |
| 7,564,826 B2 | 7/2009 | Sherman et al. |
| 7,580,397 B2 | 8/2009 | Arai et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,656,205 B2 | 2/2010 | Chen et al. |
| 7,659,003 B2 | 2/2010 | Aoki et al. |
| 7,664,085 B2 | 2/2010 | Waxman |
| 7,672,645 B2 | 3/2010 | Kilpatrick et al. |
| 7,689,190 B2 | 3/2010 | Kerth et al. |
| 7,711,004 B2 | 5/2010 | Xu |
| 7,717,342 B2 | 5/2010 | Wang |
| 7,725,118 B2 | 5/2010 | Yang et al. |
| 7,734,253 B2 | 6/2010 | Chen et al. |
| 7,826,411 B2 | 11/2010 | Gonikberg et al. |
| 7,844,222 B2 | 11/2010 | Grushkevich |
| 7,849,333 B2 | 12/2010 | Schindler |
| 7,876,786 B2 | 1/2011 | Bahl et al. |
| 7,881,746 B2 | 2/2011 | Desai |
| 7,898,948 B2 | 3/2011 | DiGirolamo et al. |
| 7,936,714 B1 | 5/2011 | Karr et al. |
| 7,957,340 B2 | 6/2011 | Choi et al. |
| 7,966,036 B2 | 6/2011 | Kojima |
| 7,983,216 B2 | 7/2011 | Iyer et al. |
| 7,995,544 B2 | 8/2011 | Benveniste |
| 8,000,715 B2 | 8/2011 | Melpignano et al. |
| 8,014,329 B2 | 9/2011 | Gong |
| 8,045,922 B2 | 10/2011 | Sherman et al. |
| 8,046,024 B2 | 10/2011 | Sudak et al. |
| 8,060,017 B2 | 11/2011 | Schlicht et al. |
| 8,072,913 B2 | 12/2011 | Desai |
| 8,073,388 B2 | 12/2011 | Grushkevich et al. |
| 8,077,652 B2 | 12/2011 | Thesling |
| 8,078,111 B2 | 12/2011 | Jovicic et al. |
| 8,081,038 B2 | 12/2011 | Lee et al. |
| 8,085,737 B2 | 12/2011 | Zhu |
| 8,107,391 B2 | 1/2012 | Wu et al. |
| 8,121,144 B2 | 2/2012 | Bitran |
| 8,126,502 B2 | 2/2012 | Trainin |
| 8,139,670 B1 | 3/2012 | Son et al. |
| 8,149,715 B1 | 4/2012 | Goel |
| 8,150,328 B2 | 4/2012 | Chaudhri et al. |
| 8,165,102 B1 | 4/2012 | Vleugels et al. |
| 8,170,002 B2 | 5/2012 | Wentink |
| 8,170,546 B2 | 5/2012 | Bennett |
| 8,189,506 B2 | 5/2012 | Kneckt et al. |
| 8,189,526 B2 | 5/2012 | Hsu et al. |
| 8,204,015 B2 | 6/2012 | Chaudhri et al. |
| 8,219,142 B2 | 7/2012 | Khairmode et al. |
| 8,229,087 B2 | 7/2012 | Sumioka et al. |
| 8,254,296 B1 | 8/2012 | Lambert |
| 8,256,681 B2 | 9/2012 | Wang |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,442,434 B2 | 5/2013 | Grushkevich et al. |
| 8,451,776 B2 | 5/2013 | Dayal et al. |
| 8,472,427 B1 | 6/2013 | Wheeler et al. |
| 8,472,968 B1 | 6/2013 | Kim |
| 8,483,190 B2 | 7/2013 | Donovan |
| 8,493,966 B2 | 7/2013 | Bendelac |
| 8,493,992 B2 | 7/2013 | Sella et al. |
| 8,496,181 B2 | 7/2013 | Wang |
| 8,526,348 B2 | 9/2013 | Desai |
| 8,532,041 B1 | 9/2013 | Lambert et al. |
| 8,537,798 B2 | 9/2013 | Tsfati et al. |
| 8,537,799 B2 | 9/2013 | Tsfati et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,599,814 B1 | 12/2013 | Vleugels et al. |
| 8,600,324 B1 | 12/2013 | Cousinard et al. |
| 8,619,732 B2 | 12/2013 | Khairmode et al. |
| 8,626,067 B2 | 1/2014 | Ko et al. |
| 8,649,734 B1 | 2/2014 | Lin et al. |
| 8,654,773 B2 | 2/2014 | Wentink et al. |
| 8,655,278 B2 | 2/2014 | Laroche et al. |
| 8,655,279 B2 | 2/2014 | Banerjea |
| 8,665,848 B2 | 3/2014 | Wentink |
| 8,730,927 B2 | 5/2014 | Thoukydides |
| 8,750,278 B1 | 6/2014 | Wagholikar et al. |
| 8,750,926 B2 | 6/2014 | Fu et al. |
| 8,767,616 B2 | 7/2014 | Choi et al. |
| 8,767,771 B1 | 7/2014 | Shukla et al. |
| 8,804,690 B1 | 8/2014 | Wheeler et al. |
| 8,805,303 B2 | 8/2014 | Koo et al. |
| 8,817,682 B1 | 8/2014 | Goel et al. |
| 8,842,618 B2 | 9/2014 | Yu et al. |
| 8,861,469 B1 | 10/2014 | Lee et al. |
| 8,913,599 B2 | 12/2014 | Gonikberg et al. |
| 9,026,162 B2 | 5/2015 | Wagholikar et al. |
| 2002/0025810 A1 | 2/2002 | Takayama et al. |
| 2002/0049854 A1 | 4/2002 | Cox et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2003/0214430 A1 | 11/2003 | Husted et al. |
| 2004/0013128 A1 | 1/2004 | Moreton |
| 2004/0063403 A1 | 4/2004 | Durrant |
| 2004/0105401 A1 | 6/2004 | Lee |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |

(56) References Cited

U.S. PATENT DOCUMENTS

| | | |
|---|---|---|
| 2004/0264396 A1 | 12/2004 | Ginzburg et al. |
| 2004/0264397 A1 | 12/2004 | Benveniste |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0195786 A1 | 9/2005 | Shpak |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0100494 A1 | 5/2008 | Yamaura |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0240998 A1 | 9/2009 | Nikkila et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0258603 A1 | 10/2009 | Ghaboosi et al. |
| 2009/0268652 A1 | 10/2009 | Kneckt et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |

(56) References Cited

U.S. PATENT DOCUMENTS

| | | |
|---|---|---|
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0087341 A1 | 4/2012 | Jang et al. |
| 2012/0099476 A1 | 4/2012 | Mahaffy |
| 2012/0115420 A1 | 5/2012 | Trainin |
| 2012/0195397 A1 | 8/2012 | Sayana et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0276938 A1 | 11/2012 | Wagholikar et al. |
| 2012/0294396 A1 | 11/2012 | Desai |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0130684 A1 | 5/2013 | Gomes et al. |
| 2013/0176903 A1 | 7/2013 | Bijwe |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0087663 A1 | 3/2014 | Burchill et al. |
| 2014/0126552 A1 | 5/2014 | Dayal et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Advisory Action", U.S. Appl. No. 12/190,251, Dec. 7, 2011, 3 pages.

"Advisory Action", U.S. Appl. No. 12/646,721, Aug. 13, 2013, 3 pages.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/186,429, Oct. 13, 2011, 23 pages.

"Final Office Action", U.S. Appl. No. 12/190,251, Sep. 13, 2011, 15 pages.

"Final Office Action", U.S. Appl. No. 12/323,292, Aug. 24, 2012, 26 pages.

"Final Office Action", U.S. Appl. No. 12/358,955, Feb. 17, 2012, 26 pages.

"Final Office Action", U.S. Appl. No. 12/358,955, Mar. 18, 2013, 12 pages.

"Final Office Action", U.S. Appl. No. 12/484,563, Apr. 24, 2012, 18 pages.

"Final Office Action", U.S. Appl. No. 12/487,425, May 3, 2012, 9 pages.

"Final Office Action", U.S. Appl. No. 12/534,361, Feb. 29, 2012, 13 pages.

"Final Office Action", U.S. Appl. No. 12/542,845, Sep. 25, 2012, 23 pages.

"Final Office Action", U.S. Appl. No. 12/616,454, Apr. 11, 2012, 19 pages.

"Final Office Action", U.S. Appl. No. 12/646,721, Jun. 6, 2013, 16 pages.

"Final Office Action", U.S. Appl. No. 12/646,802, Nov. 15, 2012, 15 pages.

"Final Office Action", U.S. Appl. No. 12/759,336, Feb. 25, 2013, 11 pages.

"Final Office Action", U.S. Appl. No. 12/883,054, Jun. 9, 2014, 22 pages.

"Foreign Office Action", CN Application No. 200980122587.0, Sep. 10, 2013, 11 Pages.

"Foreign Notice of Allowance", JP Application No. 2011-513586, Jul. 16, 2013, 2 pages.

"Foreign Office Action", CN Application No. 200980122587.0, Jan. 24, 2014, 10 Pages.

"Foreign Office Action", CN Application No. 200980122587.0, Feb. 21, 2013, 17 pages.

"Foreign Office Action", EP Application No. 13169350.9, May 9, 2014, 3 Pages.

"Foreign Office Action", EP Application No. 09789754.0, May 17, 2011, 8 pages.

"Foreign Office Action", European Patent Application No. 09789754.0, Mar. 11, 2013, 4 Pages.

"Foreign Office Action", European Patent Application No. 09789754.0, Jul. 12, 2012, 4 pages.

"Foreign Office Action", JP Application No. 2011-513586, Apr. 9, 2013, 4 Pages.

"Foreign Office Action", JP Application No. 2011-513586, Oct. 23, 2012, 7 pages.

"Further Higher Data Rate Extension in the 2.4 GHz Band", IEEE P802.11g/D8.2, Draft Supplement to Standard [for] Information Technology, Apr. 2003, 69 pages.

"IEEE Standard for Information Technology—Telecommunications and Information Exchange between Systems—Local and Metropolitan Area Networks—Specific Requirements", IEEE Std. 802.11-2007, Jun. 12, 2007, 1232 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k—2008, Jun. 12, 2008, 244 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.

"Information Technology—Telecommunications and Information Exchange Between systems—Local and Metropolitan Area Networks—Specific Requirements", IEEE Standard, Aug. 1, 2005, pp. 1-60.

"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993),Oct. 14, 2003, 80 pages.

(56) References Cited

OTHER PUBLICATIONS

"International Search Report and Written Opinion", Application No. PCT/US2013/025144, Jun. 5, 2013, 10 pages.
"International Search Report and Written Opinion", Application No. PCT/IB2013/001962, Feb. 6, 2014, 11 Pages.
"International Search Report and Written Opinion", Application No. PCT/US2012/035597, Aug. 6, 2012, 13 pages.
"International Search Report and Written Opinion", Application No. PCT/US2009/046289, Oct. 29, 2009, 13 pages.
"International Search Report and Written Opinion", Application No. PCT/US2011/054358, Dec. 16, 2011, 13 pages.
"International Search Report and Written Opinion", Application No. PCT/IB2013/000390, Aug. 21, 2013, 19 Pages.
"Introduction to 802.11n Outdoor Wireless Networks", InscapeData White Paper, Mar. 29, 2011, 9 pages.
"Non-Final Office Action", U.S. Appl. No. 13/429,090, Oct. 24, 2013, 13 pages.
"Non-Final Office Action", U.S. Appl. No. 12/167,841, Jul. 15, 2011, 10 pages.
"Non-Final Office Action", U.S. Appl. No. 12/186,429, Apr. 25, 2011, 19 pages.
"Non-Final Office Action", U.S. Appl. No. 12/190,240, Jan. 6, 2012, 7 pages.
"Non-Final Office Action", U.S. Appl. No. 12/190,251, Mar. 29, 2012, 11 pages.
"Non-Final Office Action", U.S. Appl. No. 12/190,251, Mar. 29, 2011, 8 pages.
"Non-Final Office Action", Application No. 12/235,333, Jun. 28, 2011, 16 pages.
"Non-Final Office Action", U.S. Appl. No. 12/323,292, Dec. 21, 2011, 17 pages.
"Non-Final Office Action", U.S. Appl. No. 12/358,955, Sep. 6, 2011, 24 pages.
"Non-Final Office Action", U.S. Appl. No. 12/358,955, Aug. 20, 2012, 33 pages.
"Non-Final Office Action", U.S. Appl. No. 12/478,446, Dec. 28, 2011, 17 pages.
"Non-Final Office Action", U.S. Appl. No. 12/484,563, Oct. 4, 2011, 13 pages.
"Non-Final Office Action", U.S. Appl. No. 12/487,425, Jan. 12, 2012, 7 pages.
"Non-Final Office Action", U.S. Appl. No. 12/534,361, Oct. 12, 2011, 11 pages.
"Non-Final Office Action", U.S. Appl. No. 12/542,845, Oct. 23, 2013, 29 pages.
"Non-Final Office Action", U.S. Appl. No. 12/542,845, Apr. 4, 2012, 19 pages.
"Non-Final Office Action", U.S. Appl. No. 12/616,454, Dec. 22, 2011, 8 pages.
"Non-Final Office Action", U.S. Appl. No. 12/646,721, May 8, 2014, 17 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/646,802, May 21, 2014, 19 pages.
"Non-Final Office Action", U.S. Appl. No. 12/646,802, Mar. 29, 2012, 16 pages.
"Non-Final Office Action", U.S. Appl. No. 12/732,036, Aug. 9, 2012, 13 pages.
"Non-Final Office Action", U.S. Appl. No. 12/759,336, Oct. 4, 2012, 13 pages.
"Non-Final Office Action", U.S. Appl. No. 12/883,054, Nov. 22, 2013, 18 pages.
"Non-Final Office Action", U.S. Appl. No. 13/099,169, Mar. 28, 2013, 12 pages.
"Non-Final Office Action", U.S. Appl. No. 13/099,169, Oct. 4, 2013, 9 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/458,227, Jul. 3, 2014, 10 pages.
"Non-Final Office Action", U.S. Appl. No. 13/479,124, Sep. 27, 2013, 14 pages.
"Non-Final Office Action", U.S. Appl. No. 13/536,506, Apr. 25, 2014, 12 pages.
"Non-Final Office Action", U.S. Appl. No. 13/604,563, Apr. 5, 2013, 6 pages.
"Non-Final Office Action", U.S. Appl. No. 13/656,482, Mar. 19, 2013, 19 pages.
"Non-Final Office Action", U.S. Appl. No. 13/656,502, Feb. 21, 2013, 6 pages.
"Non-Final Office Action", U.S. Appl. No. 13/673,363, Nov. 29, 2013, 12 pages.
"Non-Final Office Action", U.S. Appl. No. 13/722,354, Jan. 17, 2014, 17 pages.
"Non-Final Office Action", U.S. Appl. No. 13/757,276, Jan. 30, 2014, 9 pages.
"Non-Final Office Action", U.S. Appl. No. 13/911,979, Jan. 31, 2014, 19 pages.
"Non-Final Office Action", U.S. Appl. No. 13/911,979, Jun. 9, 2014, 11 pages.
"Non-Final Office Action", U.S. Appl. No. 13/923,949, Dec. 17, 2013, 5 pages.
"Non-Final Office Action", U.S. Appl. No. 14/089,515, May 13, 2014, 9 pages.
"Notice of Allowance", U.S. Appl. No. 12/167,841, Nov. 25, 2011, 11 pages.
"Notice of Allowance", U.S. Appl. No. 12/186,429, Jun. 6, 2013, 9 pages.
"Notice of Allowance", U.S. Appl. No. 12/190,240, May 16, 2012, 4 pages.
"Notice of Allowance", U.S. Appl. No. 12/190,251, Oct. 4, 2012, 6 pages.
"Notice of Allowance", U.S. Appl. No. 12/235,333, Nov. 15, 2011, 5 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 12/478,446, Jun. 14, 2012, 6 pages.
"Notice of Allowance", U.S. Appl. No. 12/484,563, Jul. 9, 2012, 6 pages.
"Notice of Allowance", U.S. Appl. No. 12/487,425, Jul. 26, 2013, 9 pages.
"Notice of Allowance", U.S. Appl. No. 12/534,361, Feb. 14, 2013, 12 pages.
"Notice of Allowance", U.S. Appl. No. 12/616,454, Aug. 22, 2012, 4 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/759,336, May 3, 2013, 9 pages.
"Notice of Allowance", U.S. Appl. No. 13/099,169, Feb. 12, 2014, 11 pages.
"Notice of Allowance", U.S. Appl. No. 13/249,740, Mar. 11, 2014, 6 pages.
"Notice of Allowance", U.S. Appl. No. 13/479,124, Jan. 30, 2014, 7 pages.
"Notice of Allowance", U.S. Appl. No. 13/604,563, Sep. 26, 2013, 5 pages.
"Notice of Allowance", U.S. Appl. No. 13/656,482, Sep. 3, 2013, 8 pages.
"Notice of Allowance", U.S. Appl. No. 13/656,502, Jun. 25, 2013, 11 pages.

(56) References Cited

OTHER PUBLICATIONS

"Notice of Allowance", U.S. Appl. No. 13/673,363, Mar. 24, 2014, 4 pages.
"Notice of Allowance", U.S. Appl. No. 13/722,354, May 15, 2014, 4 pages.
"Notice of Allowance", U.S. Appl. No. 13/923,949, Mar. 31, 2014, 6 pages.
"Part 11: Wireless LAN Medium Access Control (MAC) and Physical Layer (PHY) specifications", IEEE Std 802.11b-1999/Cor 1-2001, Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band,1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—, IEEE, Apr. 2003, pp. 1-69.
"Restriction Requirement", U.S. Appl. No. 12/167,841, May 12, 2011, 6 pages.
"Search Report", European Application No. 13169350.9, Aug. 13, 2013, 10 Pages.
"Supplemental Notice of Allowance", U.S. Appl. No. 12/186,429, Jul. 10, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/358,955, Oct. 11, 2013, 3 pages.
"Supplemental Notice of Allowance", U.S. Appl. No. 12/716,569, Jul. 23, 2012, 2 pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/759,336, Aug. 14, 2013, 2 pages.
"Supplemental Notice of Allowance", U.S. Appl. No. 13/479,124, Apr. 18, 2014, 5 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"Wi-Fi Peer-to-Peer (P2P) Technical Specification", Wi-Fi Alliance Technical Committee P2P Task Group; Draft Version 1.14, Jun. 25, 2010, 154 pages.
Haas, et al., "Gossip-Based Ad Hoc Routing", IEEE/ACM Transactions on Networking, vol. 14, No. 3, Jun. 2006, pp. 479-491.
Jung, et al., "A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.
Jung, et al., "A Power Control MAC Protocol for Ad Hoc Networks", In Proceedings of MOBICOM 2002, Sep. 23, 2002, pp. 36-47.
Mazzanti, et al., "Analysis and Design of Injection-Locked LC Dividers for Quadrature Generation", IEEE Journal of Solid-State Circuits, vol. 39, No. 9, Sept. 2004, pp. 1425-1433.
Mujtaba, "TGn Sync Proposal Technical Specification", IEEE 802.11-04/0889r6, This document presents the technical specification for the MAC and the PHY layer of the TGn Sync proposal to IEEE 802.11 TGn,May 18, 2005, pp. 1-131.
Qiao, et al., "Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
Tinnirello, et al., "Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Non-Final Office Action", U.S. Appl. No. 13/761,949, Jan. 12, 2015, 16 pages.
"Notice of Allowance", U.S. Appl. No. 13/458,227, Jan. 2, 2015, 7 pages.
"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601.
"Amendment 4: TV White Spaces Operation", The Institute of Electrical and Electronics Engineers, Inc., IEEE Std P802.11af/D1.05 Draft Standard for Information Technology-Telecommunications and Information Exchange Between Systems-Local and Metropolitan area networks—Specific Requirements, Part 11: Wireless LAN Medium Access Control (MAC) and Physical Layer, Nov. 2011, 123 Pages.
"Amendment 5: Enhancements for Very High Throughput for Operation in Bands below 6 GHz", Prepared by the 802.11 Working Group of the 802 Committee, IEEE P802.11 ac®/D0.2 Draft Standard for Information Technology-IEEE P802.11ac/D0.2. Mar. 2011 Telecommunications and information exchange between systems-Local and metropolitan area networks Specific requirements Part 11: Wireless LAN Medium Access Co, Mar. 2011, 184 Pages.
"Amendment 5: Protected Management Frames", Prepared by: IEEE 802 Committee of the IEEE Computer Society, P802.11w®/D4.0 Draft Standard for Information Technology-Telecommunications and information exchange between systems-Local and metropolitan area networks-Specific requirements—Part 11: Wireless LAN Medium Access Control (MAC) and Physical Layer (PHY) spec, Nov. 2007, 63 Pages.
"Amendment 6: Medium Access Control (MAC) Security Enhancements", Prepared by the LAN/MAN Standards Committee of the IEEE Computer Society, IEEE Standard for Information Technology Telecommunications and information exchange between systems—Local and metropolitan area networks Specific requirements Part 11: Wireless LAN Medium Access Control (MAC) and Physical Layer (PHY) specifications, Jul. 23, 2004, 190 Pages.
"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.
"Amendment 7: Medium Access Control (MAC) Quality of Service (QoS) Enhancements", Prepared by the LAN/MAN Standards Committee of the IEEE Computer Society, IEEE Standard for Information Technology-Telecommunications and information exchange between systems-Local and metropolitan area networks Specific requirements Part 11: Wireless Medium Access Control, Oct. 2004, 195 Pages.
"Amendment 8: IEEE 802.11 Wireless Network Management", Prepared by the LAN/MAN Standards Committee of the IEEE Computer Society, Draft Standard for Information technology Telecommunications and information exchange between systems-Local and metropolitan area networks Specific requirements-Part 11: Wireless Lan Medium Access Control (MAC) and Physical Layer (PHY) specifications, Aug. 2010, 426 Pages.
"Higher-Speed Physical Layer Extension in the 2.4 GHz Band", LAN/MAN Standards Committee of the IEEE Computer Society, IEEE Std 802.11b Supplement to Standard for Information Technology-Telecommunications and Information Exchange Between Systems-Local and Metropolitan area networks—Specific Requirements, Part 11: Wireless Lan Medium Access Control (MAC) and Physical Layer, Sep. 16, 1999, 96 Pages.
"IEEE P802.11ac (TM) / D2.0", Draft Standard for Information Technology—Telecommunications and information exchange

(56) References Cited

OTHER PUBLICATIONS between systems—Local and metropolitan area networks—Specific Requirements / Part 11: Wireless Lan Medium Control (MAC) and Physical Layer (PHY) specifications / Am, Jan. 2012, 359 pages.

"Notice of Allowance", U.S. Appl. No. 13/761,949, Jul. 28, 2015, 8 pages.

Gunman,"Multi-Rate Layered Decoder Architecture for Block LDPC Codes of the IEEE 802.11n Wireless Standard", Department of Electrical and Computer Engineering Texas A&M University, 2007, 4 Pages.

US 9,131,520 B1

PACKET EXCHANGE ARBITRATION FOR COEXISTING RADIOS

RELATED APPLICATIONS

This application is a continuation of and claims priority to U.S. Utility application Ser. No. 13/923,949, filed Jun. 21, 2013, now U.S. Pat. No. 8,804,690 which in turn claims priority to U.S. Utility application Ser. No. 12/732,036, filed Mar. 25, 2010, now U.S. Pat. No. 8,472,427 which in turn claims priority to U.S. Provisional Patent Application Ser. No. 61/166,985 filed Apr. 6, 2009, the disclosure of which are incorporated by reference herein in their entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Wireless communication devices typically employ multiple radio modules to communicate with multiple wireless networks. These devices, however, often have fewer antennas than radio modules. In such a case, an arbiter allows the multiple radio modules to timeshare an antenna. An antenna switch, controlled by the arbiter, connects an antenna to one of the radio modules for wireless communication. Arbitration is usually performed on a per-packet basis, a packet being a basic unit of wireless communication. Some wireless communications, however, include packet exchanges that span multiple packets. Accordingly, when an arbiter switches an antenna from one radio module to another radio module prior to a packet exchange ending, the packet exchange is interrupted.

SUMMARY

This summary is provided to introduce subject matter that is further described below in the Detailed Description and Drawings. Accordingly, this Summary should not be considered to describe essential features nor used to limit the scope of the claimed subject matter.

A method is described for initiating a request to an arbiter for access to an antenna, communicating a packet via the antenna as part of a packet exchange, and maintaining the request to the arbiter at least until the packet exchange has been communicated.

Another method is described for determining that a time-sensitive packet is scheduled for communication during an upcoming time slot, initiating a request to an arbiter for access to an antenna, receiving a grant of the request, and maintaining the request to the arbiter at least until communication of the time-sensitive packet.

Still another method is described for determining that a first request for access to an antenna is requesting to communicate a first packet non-isochronously, determining that a second request for access to an antenna is requesting to communicate a second packet isochronously, determining that the first request and the second request are in contention, and delaying a grant of the first request until communication of the second packet.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for arbitration on a per-packet basis may switch an antenna from one radio module to another radio module prior to a packet exchange ending, thus potentially interrupting the packet exchange. This disclosure describes techniques for packet exchange arbitration.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
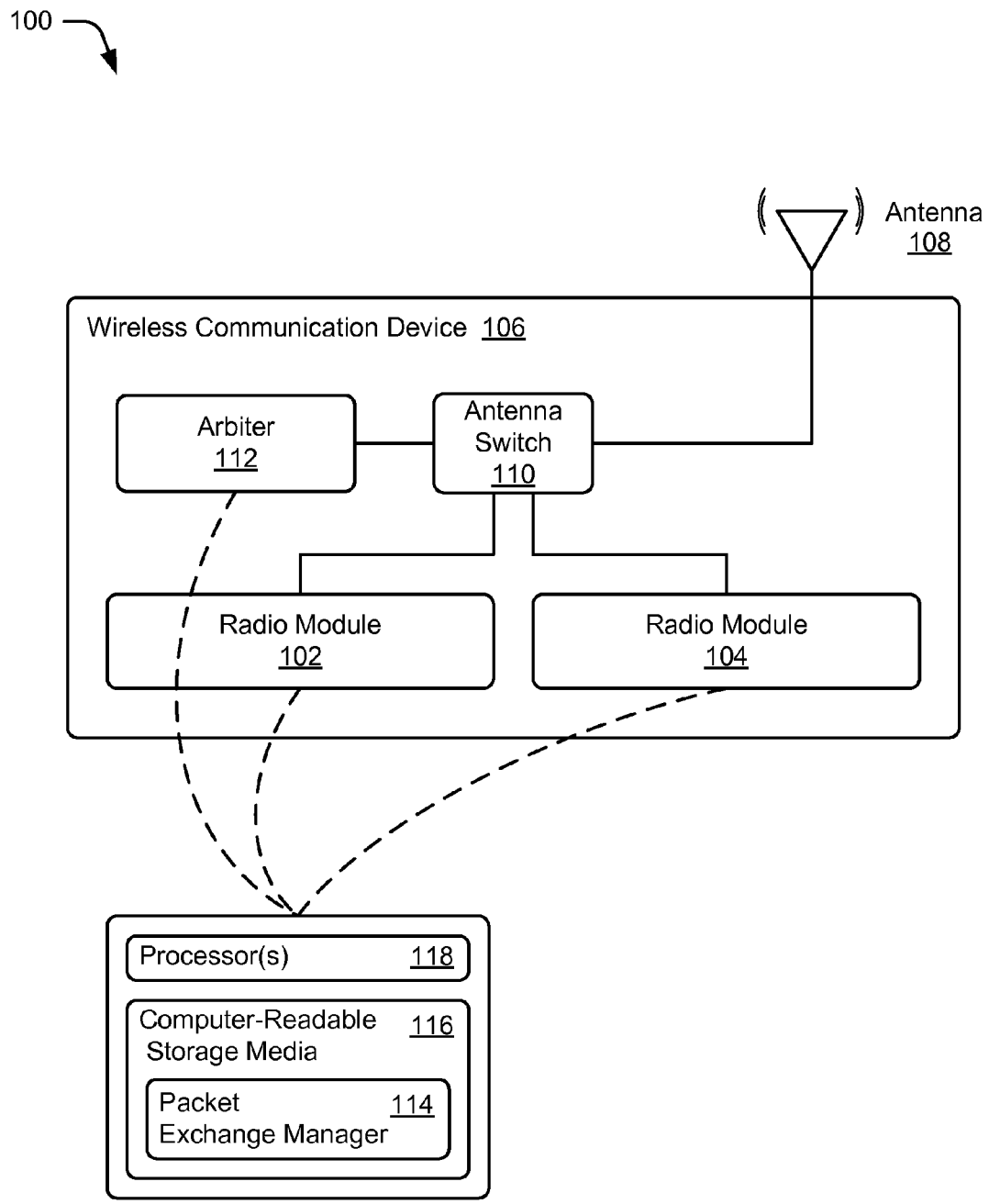
FIG. 1 illustrates an operating environment having radio modules in accordance with one or more embodiments.

FIG. 1 illustrates an operating environment 100 having radio modules 102 and 104 as components of wireless communication device 106. Radio modules 102 and 104 are each capable of transmitting and receiving wireless communications. Wireless communications of radio modules 102 and 104 may comprise isochronous and/or non-isochronous packets. Isochronous packets are communicated during scheduled time slots.

Radio module 102 is a wireless local area network (LAN) radio for communication according to a wireless LAN protocol. Radio module 104 is a short-range wireless radio for communication according to a personal-area-network protocol, such as Bluetooth™. When communicating according to the Bluetooth™ protocol, radio module 104 may communicate using various Bluetooth profiles including adaptive audio distribution (A2DP), dial-up networking (DUN), personal area networking (PAN), and object push (OPP) to name a few. Antenna 108 is timeshared between radio modules 102 and 104. When connected to antenna 108, each radio module 102, 104 may communicate packets over a wireless network. Connection of antenna 108 to radio module 102 or radio module 104 is made via antenna switch 110. Antenna switch 110 is controlled by arbiter 112, which is configured to arbitrate access of antenna 108.

Radio modules 102 and 104 request access to antenna 108 to communicate packets. Packet communications of radio modules 102 and 104 are asynchronous from each other, which can result in contending requests to transmit and/or receive packets via antenna 108. Arbiter 112 arbitrates contending requests for access to antenna 108, granting one request at a time. Arbitration can be based on various parameters, such as a priority level associated with a request. Requests that are not granted can cause a requesting radio module to abort, delay, or retry packet communications.

Antenna switch 110 connects a radio module to antenna 108 while arbiter 112 grants the request of the radio module. The connected radio module may then communicate via antenna 108 until the grant ends. In one embodiment, arbiter 112 is configured to end a grant of a request responsive to receiving a contending request having a higher associated priority level. When a grant of a request ends prior to completion of a packet exchange, a radio module may cancel the incomplete packet exchange or attempt to re-communicate the incomplete packet exchange.

Radio modules 102 and 104 may each include a packet exchange manager 114, which can be embodied separately and distinctly on each respective radio module. Alternately or additionally, packet exchange manager 114 is embodied on other components of wireless communication device 106, such as arbiter 112.

Packet exchange manager 114 includes computer-executable instructions stored on computer-readable storage media 116. When executed by one or more processors 118, a component on which packet exchange manager 114 is embodied acts according to those instructions. Packet exchange manager 114 acts independently and/or in conjunction with various other entities of wireless communication device 106, such as by being firmware integrated into a System-on-Chip (SoC) having or communicating with antenna switch 110 and arbiter 112.

Techniques of Packet Exchange Arbitration

The following discussion describes techniques of packet exchange arbitration. These techniques can be implemented using the previously described environment, such as by packet exchange manager 114 of FIG. 1 embodied on arbiter 112 or radio modules 102 and/or 104. These techniques include methods illustrated in FIGS. 2, 3, and 4, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 2:
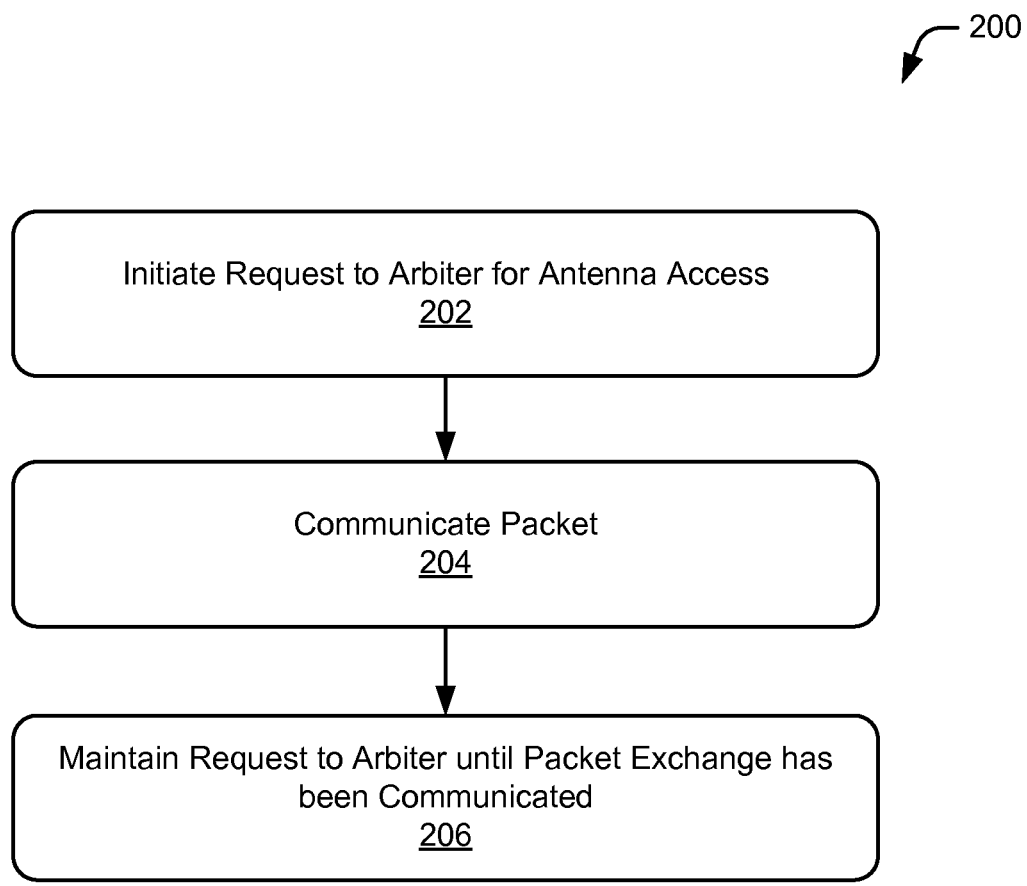
FIG. 2 illustrates a method for maintaining a request to an arbiter until a packet exchange has been communicated in accordance with one or more embodiments.

FIG. 2 depicts a method 200 for packet exchange arbitration. Method 200 maintains a request to an arbiter until a packet exchange has been communicated. Operations of method 200 can be performed by packet exchange manager 114 of FIG. 1, which will be used to describe particular implementations and embodiments of this method.

At 202, a first radio module initiates a request to an arbiter for access to an antenna. The request may have a priority level affecting access to the antenna.

At 204, a packet is communicated with the first radio via the antenna as part of a packet exchange. The packet exchange can comprise any number of packets, transmitted and/or received, via the antenna. In some instances the packet may be communicated responsive to receiving a grant of the request. The grant of the request indicates access to the antenna. Access to the antenna continues until the grant of the request ends. In some instances, a grant is received responsive to the request having a higher priority level than a contending request.

At 206, the first radio module continues to maintain the request to the arbiter, such as by packet exchange manager 114, at least until the packet exchange ends. The packet exchange ends once all of the packets of the packet exchange have been communicated. In one embodiment, maintaining the request to the arbiter is responsive to determining that the communicated packet is part of a packet exchange. In some instances, maintaining the request to the arbiter is effective to prevent another radio module from obtaining access to the antenna, interrupting the packet exchange. Packet exchange manager 114 can maintain the request until a response packet is received from a remote entity via the antenna, for example, or until a request timeout occurs.

Optionally as part of 206, packet exchange manager 114 changes the priority level of the request for a remaining duration of the packet exchange. For instance, packet exchange manager 114 may change the priority level of the request responsive to determining that the packet exchange has a priority level different from the communicated packet. In other instances, the priority level of the request remains constant during the packet exchange.

Initiating and maintaining the request for antenna access during method 200 uses a common signal or line, different signals, or separate lines.

Figure 3:
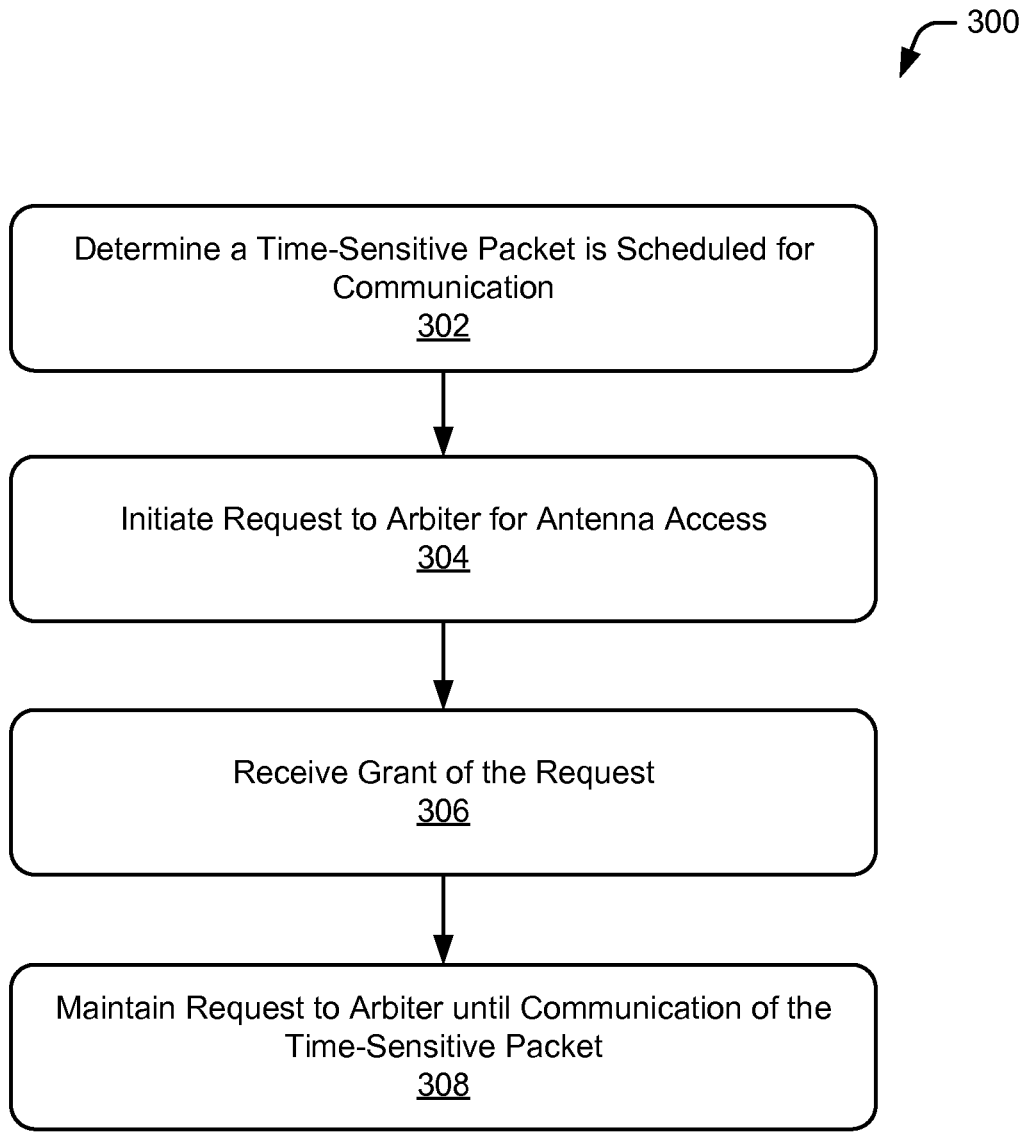
FIG. 3 illustrates a method for maintaining a request to an arbiter until communication of a time-sensitive packet in accordance with one or more embodiments.

FIG. 3 depicts a method 300 for packet exchange arbitration. Method 300 maintains a request to an arbiter until a time-sensitive packet is communicated. Operations of method 300 can be performed by packet exchange manager 114 of FIG. 1.

At 302, it is determined that a time-sensitive packet is scheduled for communication during an upcoming time slot. The upcoming time slot can be the next or any subsequent time slot. A short-range wireless radio, such as a radio communicating according to Bluetooth™ protocol, may schedule time-sensitive packets for communication during upcoming time slots of a synchronous connection oriented (SCO) link communication, which packet exchange manager 114 determines. In some instances, the radio communicating according to Bluetooth™ protocol may schedule a time-sensitive packet, such as an asynchronous connectionless link (ACL) packet, for communication at a time likely to cause cancellation of packet communications of another radio.

At 304, a request is initiated to an arbiter for access to an antenna. The request may include a priority level affecting arbitration. The priority level of the request corresponds to the priority level of the packet, is set to a default level, or is determined by an escalation algorithm. The escalation algorithm can increase the priority level of a request responsive to not receiving a grant of an initial or prior request. Alternately or additionally, the escalation algorithm may also increase the priority level of a request responsive to a grant of the request ending during packet communication. For instance, a priority level of a request can be increased after each failed attempt to communicate a packet via the antenna.

At 306, a grant of the request is received, indicating access to an antenna. Access to the antenna continues until the grant of the request ends. The grant of the request may end responsive to arbitration with a contending request of higher priority.

At 308, the request is maintained to the arbiter by packet exchange manager 114 at least until the time-sensitive packet can be communicated. In one embodiment, maintaining the request to the arbiter is responsive to determining that the time-sensitive packet is scheduled for communication during an upcoming time slot. In some instances, maintaining the request to the arbiter is effective to prevent another radio module from starting communication of a packet or packet exchange that will be interrupted by the time-sensitive packet scheduled for the upcoming time slot. In one embodiment, packet exchange manager 114 maintains the request until the start, middle, or end of the upcoming time slot.

While the request is maintained at 308, the time-sensitive packet is communicated via the antenna. Packet exchange manager 114 ceases to maintain the request responsive to an indication that the time-sensitive packet is communicated or after a period of time.

Figure 4:
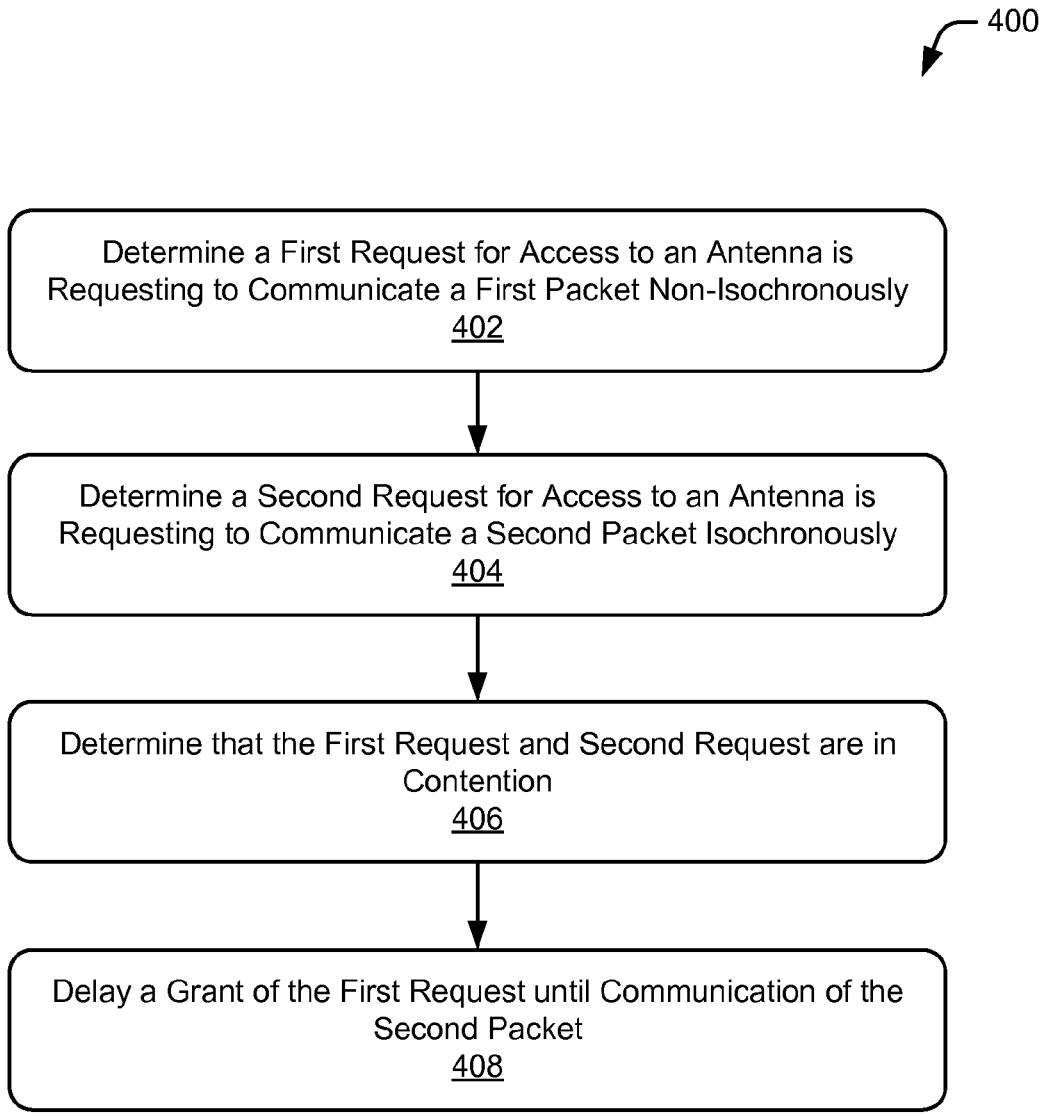
FIG. 4 illustrates a method of delaying a grant of a request until communication of a packet in accordance with one or more embodiments.

FIG. 4 depicts a method 400 for packet exchange arbitration. Method 400 delays a grant of a request until communication of an isochronous packet. Operations of method 400 can be performed by packet exchange manager 114 of FIG. 1.

At 402, it is determined that a first request for access to an antenna is requesting to communicate a first packet non-isochronously. An indication that the first packet is non-isochronous may be part of the first request, multiplexed within the first request, or within a separate signal. The first request can be analyzed by packet exchange manager 114 embodied on arbiter 112, either radio module 102, 104, or some other location in wireless communication device 106.

At 404, it is determined that a second request for access to an antenna is requesting to communicate a second packet isochronously. An indication that the second packet is isochronous may be part of the second request, multiplexed within the second request, or a separate signal. In some instances, the request may indicate communication of the isochronous packet is scheduled for an upcoming time slot. In at least some embodiments, priority levels associated with isochronous packets are higher than priority levels associated with non-isochronous packets, resulting in the cancellation of contending non-isochronous packet communications due to arbitration. The second request is received at arbiter 112, by a component of wireless communication device 106 residing communicatively between arbiter 112 and radio module 102 or 104, or one of radio modules 102 or 104. Thus, the second request can be analyzed by packet exchange manager 114 embodied on arbiter 112, either radio module 102, 104, or some other location in wireless communication device 106.

At 406, it is determined that the first request and the second request are in contention. Contention can be determined by arbiter 112 when both the first request and the second request are requesting access to an antenna contemporaneously. In other instances, contention of the first request and the second request is determined prior to either or both requests being received by arbiter 112.

At 408, a grant of the first request is delayed, e.g., by packet exchange manager 114, at least until communication of the second packet. Delaying the grant of the first request is effective to prevent communication of the first packet from being interrupted by communication of the second packet. Packet exchange manager 114 can delay the grant of the first request at arbiter 112 until communication of the second packet or delay the grant of the first request by delaying the first request at one of the radio modules 102, 104. Thus, packet exchange manager 114 ceases, at some point, to delay the grant of the first request, such as responsive to an indication that the second packet is communicated.

After packet exchange manager 114 ceases to delay the grant of the first response at 408, the first packet may be communicated responsive to a grant of the first request. Packet exchange manager 114 can repeat operations 402, 404, 406, and 408 effective to reduce contending requests by aligning non-isochronous packets and isochronous packet communication.

System-on-Chip

Figure 5:
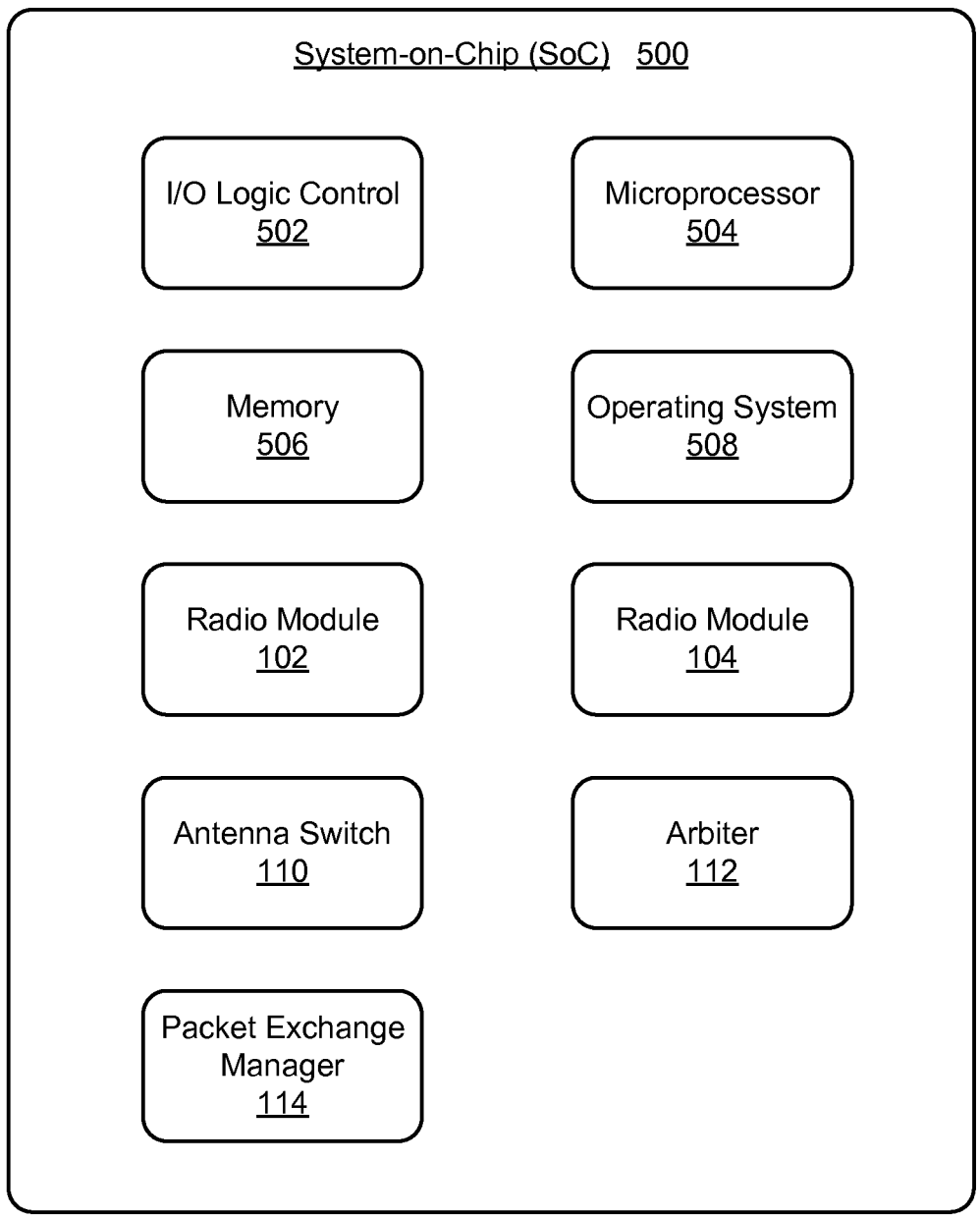
FIG. 5 illustrates a System-on-Chip (SoC) environment for implementing embodiments of the techniques described herein.

FIG. 5 illustrates a System-on-Chip (SoC) 500, which can implement various embodiments described above. A SoC can be implemented in a fixed or mobile device, such as a computing device, game console, camera, printer, cell phone, digital video recorder, picture frame, and/or any other type of device that may communicate with multiple wireless networks.

SoC 500 can be integrated with electronic circuitry, a microprocessor, memory, input-output (I/O) logic control, communication interfaces and components, other hardware, firmware, and/or software needed to run an entire device. SoC 500 can also include an integrated data bus (not shown) that couples the various components of the SoC for data communication between the components. A wireless communication device that includes SoC 500 can also be implemented with many combinations of differing components.

In this example, SoC 500 includes various components such as an input-output (I/O) logic control 502 (e.g., to include electronic circuitry) and a microprocessor 504 (e.g., any of a microcontroller or digital signal processor). SoC 500 also includes a memory 506, which can be any type of random access memory (RAM), a low-latency nonvolatile memory (e.g., flash memory), read only memory (ROM), and/or other suitable electronic data storage. SoC 500 can also include various firmware and/or software, such as an operating system 508, which can be computer-executable instructions maintained by memory 506 and executed by microprocessor 504. SoC 500 can also include other various communication interfaces and components, wireless communication components, other hardware, firmware, and/or software.

SoC 500 includes radio modules 102 and 104, antenna switch 110, arbiter 112, and packet exchange manager 114. Examples of these various components, functions, and/or entities, and their corresponding functionality, are described with reference to the respective components of the environment 100 shown in FIG. 1.

Packet exchange manager 114 in SoC 500, either independently or in combination with other entities, can be implemented as computer-executable instructions maintained by memory 506 and executed by microprocessor 504 to implement various embodiments and/or features described herein. Packet exchange manager may also be provided integral with other entities of the SoC, such as integrated with one or both of radio modules 102 and 104, or arbiter 112. Alternatively or additionally, packet exchange manager and the other components can be implemented as hardware, firmware, fixed logic circuitry, or any combination thereof that is implemented in connection with the I/O logic control 502 and/or other signal processing and control circuits of SoC 500.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
determining that a first time-sensitive packet of a first radio module is scheduled for communication during a first time slot, the first time slot being an upcoming time slot in a series of time slots during which the first radio is configured to communicate respective time-sensitive packets via an antenna;
initiating, to an arbiter and before a second radio module requests access to the antenna to communicate a packet exchange, a request for access to the antenna, the arbiter configured to arbitrate access to the antenna between the first radio module the second radio module;
communicating, during the first time slot, the first time-sensitive packet of the first radio module via the antenna; and
maintaining the request to the arbiter at least until an end of the first time slot effective to delay initiation of the packet exchange by the second radio module until after the first time slot such that communication of the packet exchange occurs between the first time slot and communication of a second time-sensitive packet during a second time slot in the series of time slots.

2. The method of claim 1, wherein the request is a first request, the second radio module requests access to the antenna by initiating a second request for access to the antenna, and maintaining the first request to the arbiter is effective to delay the arbiter from granting the second request initiated by the second radio module.

3. The method of claim 2, wherein the arbiter is configured to arbitrate the first request and the second request based on a respective priority level of the requests.

4. The method of claim 3, wherein the respective priority level of the first request is higher than that of the second request and indicates that the first radio module is requesting antenna access to communicate a time-sensitive packet.

5. The method of claim 1, wherein the request for antenna access is initiated to the arbiter before a start of the first time slot effective to prevent the second radio module from initiating the communication of the packet exchange before the first time slot.

6. The method of claim 1, wherein the first radio module comprises a short-range wireless radio and the second radio module comprises a wireless local area network radio.

7. The method of claim 1, wherein the communication of the packet exchange includes bi-directional communication of multiple packets when the second radio module has access to the antenna.

8. A communication device comprising:
a first radio module configured to communicate packets during respective time slots in a series of time slots;
a second radio module configured to communicate packet exchanges of multiple packets;
an arbiter configured to arbitrate access to an antenna between the first radio module and the second radio module; and
a packet exchange manager, the packet exchange manager configured to:
determine that a first time-sensitive packet of the first radio module is scheduled for communication via the antenna during a first time slot, the first time slot being an upcoming time slot in the series of time slots;
initiate, to the arbiter and before the second radio module requests access to the antenna to communicate a packet exchange, a request for access to the antenna; and
maintain the request to the arbiter at least until an end of the first time slot effective to delay initiation of the packet exchange by the second radio module until after the first time slot such that communication of the packet exchange occurs between the first time slot and communication of a second time-sensitive packet during a second time slot in the series of time slots.

9. The communication device of claim 8, wherein the packet exchange manager is further configured to initiate the request to the arbiter before the first time slot effective to prevent the second radio module from initiating the packet exchange before the first time slot.

10. The communication device of claim 8, wherein the request is a first request, the second radio module requests access to the antenna by initiating a second request for access to the antenna, and maintaining the first request to the arbiter is effective to delay the arbiter from granting the second request initiated by the second radio module.

11. The communication device of claim 10, wherein the arbiter is further configured to arbitrate access to the antenna based on a priority level associated with requests received by the arbiter and a priority level associated with the time-sensitive packets is higher than another priority level associated with communications of the second radio module.

12. The communication device of claim 8, wherein the second time slot is a next time slot following the first time slot in the series of time slots during which the first radio is configured to communicate.

13. The communication device of claim 8, wherein the first radio module communicates in accordance with a Bluetooth™ protocol and the time sensitive packet is a synchronous connection oriented (SCO) packet or an asynchronous connection link (ACL) packet.

14. One or more computer-readable storage devices comprising processor-executable instructions that, responsive to execution by a processor, implement a packet exchange manager to:
determine that a first time-sensitive packet of a first radio module is scheduled for communication during a first time slot, the first time slot being an upcoming time slot in a series of time slots during which the first radio is configured to communicate respective time-sensitive packets via an antenna;
initiate, to an arbiter and before a second radio module requests access to the antenna to communicate a packet exchange, a request for access to the antenna, the arbiter configured to arbitrate access to the antenna between the first radio module the second radio module;
receive, from the arbiter, a grant of the request effective to enable the first radio module to communicate the first time-sensitive packet via the antenna; and
maintain the request to the arbiter at least until an end of the first time slot effective to delay initiation of the packet exchange by the second radio module until after the first time slot such that communication of the packet exchange occurs between the first time slot and communication of a second time-sensitive packet during a second time slot in the series of time slots.

15. The computer-readable storage devices of claim 14, wherein the request is a first request, the second radio module requests access to the antenna by initiating a second request for access to the antenna, and maintaining the first request to the arbiter is effective to delay the arbiter from granting the second request initiated by the second radio module.

16. The computer-readable devices of claim 15, wherein the arbiter is further configured to arbitrate access to the antenna based on a priority level associated with requests received by the arbiter and a priority level associated with the time-sensitive packets is higher than another priority level associated with communications of the second radio module.

17. The computer-readable storage devices of claim 14, wherein delaying the initiation of the packet exchange until after the first time slot is effective to temporally align respective communications of the first radio module and the second radio module.

18. The computer-readable storage devices of claim 14, wherein the packet exchange manager is further configured to initiate the request to the arbiter before the first time slot effective to prevent the second radio module from initiating the packet exchange before the first time slot.

19. The one or more computer-readable storage devices of claim 14, wherein the second radio is wireless local area network (WLAN) radio that communicates in accordance with an IEEE 802.11 standard and the packet exchange includes bidirectional communication of packets with a WLAN access point.

20. The one or more computer-readable storage devices of claim 14, wherein the packet exchange manager is embodied, in whole or part, on the first radio module or the arbiter.

* * * * *